UNITED STATES PATENT OFFICE.

CHARLES G. SMITH, OF MOUNT VERNON, NEW YORK.

IMPROVED COMPOSITION FOR WATERPROOFING CLOTH, LEATHER, &c.

Specification forming part of Letters Patent No. 35,400, dated May 27, 1862.

*To all whom it may concern:*

Be it known that I, CHARLES G. SMITH, of Mount Vernon, in the county of Westchester and State of New York, have invented a new and Improved Composition for Making Leather, Cloth, and other Fabrics Impervious to Water; and I do hereby declare that the following is a full, clear, and exact description of the same.

This invention consists in a composition made of linseed-oil, white wax, spermaceti, litharge, and Burgundy pitch, which ingredients are mixed together in the manner and about in the proportion hereinafter more fully explained and described, and the composition, when applied to leather, cloth, or other fabric, will make the same perfectly impervious to water.

The proportion in which I mix the above-named ingredients together is about as follows: linseed-oil, one gallon; white wax, one-fourth pound; spermaceti, one-fourth pound; litharge, one-fourth pound; Burgundy pitch, one-fourth pound. The several ingredients are put into a kettle and heated until the solid parts are completely dissolved in the oil. When this takes place the kettle is removed from the fire, and the articles which are to be made impervious to water are now dipped into it for a longer or shorter space of time, and when taken out they are left to drain; or they may be passed through suitable smoothing-rollers or treated simply with the smoothing-iron, if it should be found necessary, in order to restore them to their original shape and to render them smooth and even. If the articles have been left long enough in my composition to become thoroughly saturated with the same, they are rendered completetly impervious to water. The composition, when properly treated, has no disagreeable smell, and it is not subjected to the changes of the weather, so that it should become sticky in the heat of the sun or crack in cold weather, and it can be applied to leather, cloth, or fabric of any description whatever with equal advantage. It also serves as a preservation for the article to which it may have been applied, rendering the same stronger and perfectly proof against the injurious influence of the wet or cold.

Having thus fully described my invention, what I claim as new, and desire to secure by Letters Patent, is—

The within-described composition, consisting of linseed-oil, white wax, spermaceti, litharge, and Burgundy pitch, mixed togther in the manner and about the proportion herein specified.

C. G. SMITH.

Witnesses:
JAMES LAIRD,
E. W. HODGSON.